United States Patent
Ma et al.

(10) Patent No.: US 10,805,539 B2
(45) Date of Patent: Oct. 13, 2020

(54) ANTI-SHAKE METHOD FOR CAMERA AND CAMERA

(71) Applicant: Hangzhou Hikvision Digital Technology Co., Ltd., Hangzhou, Zhejiang (CN)

(72) Inventors: Weimin Ma, Zhejiang (CN); Chenyi Shen, Zhejiang (CN); Huan Wang, Zhejiang (CN); Can You, Zhejiang (CN)

(73) Assignee: Hangzhou Hikvision Digital Technology Co., Ltd., Hangzhou, Zhejiang (CN)

( * ) Notice: Subject to any disclaimer, the term of this patent is extended or adjusted under 35 U.S.C. 154(b) by 0 days.

(21) Appl. No.: 16/461,249

(22) PCT Filed: Nov. 30, 2017

(86) PCT No.: PCT/CN2017/114003
§ 371 (c)(1),
(2) Date: May 15, 2019

(87) PCT Pub. No.: WO2018/099435
PCT Pub. Date: Jun. 7, 2018

(65) Prior Publication Data
US 2019/0320118 A1    Oct. 17, 2019

(30) Foreign Application Priority Data

Dec. 2, 2016  (CN) .......................... 2016 1 1097722
Dec. 2, 2016  (CN) ...................... 2016 2 1316113 U

(51) Int. Cl.
*H04N 5/232*    (2006.01)
*G02B 27/64*    (2006.01)
(Continued)

(52) U.S. Cl.
CPC ....... *H04N 5/23258* (2013.01); *G02B 27/646* (2013.01); *G03B 5/00* (2013.01);
(Continued)

(58) Field of Classification Search
None
See application file for complete search history.

(56) References Cited

U.S. PATENT DOCUMENTS 5,170,255 A * 12/1992 Yamada ............. H04N 5/23248
                                                                348/207.99
5,198,856 A *  3/1993 Odaka .................... G03B 17/00
                                                                396/291
(Continued)

FOREIGN PATENT DOCUMENTS

CN    101452180 A    6/2009
CN    104702840 A    6/2015
(Continued)

*Primary Examiner* — William B Perkey
(74) *Attorney, Agent, or Firm* — Bret E. Field; Bozicevic, Field & Francis LLP

(57) ABSTRACT

Provided in an embodiment of the present application are an anti-shake method for a camera and a camera. The method comprises: obtaining current shake data of a camera, wherein the shake data comprises position change data of the camera when the camera shakes, and the shake data is detected by a shake detector; determining, according to a preset relationship between position change of an anti-shake lens for shake compensation and shake data, movement data of the anti-shake lens; and adjusting a position of the anti-shake lens according to the movement data, so that an image sensor captures a shake-compensated image. By applying the embodiment of the present application, anti-shake processing can be performed for the higher or lower frequency shake, improving anti-shake performance.

16 Claims, 6 Drawing Sheets

(51) Int. Cl.
*G03B 5/00* (2006.01)
*H04N 5/225* (2006.01)
*H04N 7/18* (2006.01)

(52) U.S. Cl.
CPC ....... *H04N 5/2254* (2013.01); *H04N 5/23261* (2013.01); *H04N 7/183* (2013.01); *G03B 2205/0007* (2013.01)

(56) References Cited

U.S. PATENT DOCUMENTS

| | | | | |
|---|---|---|---|---|
| 5,761,545 | A * | 6/1998 | Tanaka | G03B 5/00 |
| | | | | 348/E5.046 |
| 9,756,249 | B1 * | 9/2017 | Segapelli | H04N 5/23261 |
| 2006/0083502 | A1 * | 4/2006 | Higo | H04N 5/23261 |
| | | | | 396/55 |
| 2006/0216010 | A1 * | 9/2006 | Yamanouchi | H04N 5/23254 |
| | | | | 396/55 |
| 2009/0231452 | A1 * | 9/2009 | Noguchi | G03B 17/00 |
| | | | | 348/208.11 |
| 2011/0013031 | A1 * | 1/2011 | Miyasako | G02B 27/646 |
| | | | | 348/208.99 |
| 2011/0102612 | A1 * | 5/2011 | Iwata | G03B 5/00 |
| | | | | 348/208.11 |
| 2011/0134259 | A1 * | 6/2011 | Kim | H04N 5/23248 |
| | | | | 348/208.4 |
| 2011/0158620 | A1 * | 6/2011 | Kanayama | G03B 5/00 |
| | | | | 396/55 |
| 2011/0273572 | A1 * | 11/2011 | Tsuchida | H04N 5/23258 |
| | | | | 348/208.4 |
| 2012/0019679 | A1 | 1/2012 | Tsubusaki | |
| 2012/0033091 | A1 * | 2/2012 | Miyasako | H04N 5/23258 |
| | | | | 348/208.1 |
| 2013/0004151 | A1 | 1/2013 | Wakamatsu | |
| 2013/0034345 | A1 | 2/2013 | Miyahara | |
| 2015/0172546 | A1 * | 6/2015 | Takeuchi | H04N 5/23258 |
| | | | | 348/208.6 |
| 2016/0295115 | A1 * | 10/2016 | Hjelmstrom | H04N 5/23287 |
| 2017/0142336 | A1 * | 5/2017 | Muto | H04N 5/23212 |
| 2018/0220074 | A1 * | 8/2018 | Mukunashi | H04N 5/23296 |
| 2018/0352127 | A1 * | 12/2018 | Wang | H04N 5/2254 |
| 2019/0320118 | A1 * | 10/2019 | Ma | G02B 27/646 |

FOREIGN PATENT DOCUMENTS

| | | |
|---|---|---|
| CN | 104780311 A | 7/2015 |
| CN | 105814484 A | 7/2016 |
| CN | 105872376 A | 8/2016 |
| CN | 106060411 A | 10/2016 |
| CN | 206181216 U | 5/2017 |
| EP | 1980904 A2 | 10/2008 |
| JP | 2004029640 A | 1/2004 |

* cited by examiner

ANTI-SHAKE METHOD FOR CAMERA AND CAMERA

The present application claims the priority to a Chinese Patent Application No. 201611097722.9, entitled "ANTI-SHAKE METHOD FOR CAMERA AND CAMERA" and a Chinese Patent Application No. 201621316113.3, entitled "Surveillance Camera" filed with the China National Intellectual Property Administration on Dec. 2, 2016, which are incorporated into the present application by reference in their entireties.

TECHNICAL FIELD

The present application relates to a field of camera, and in particular to an anti-shake method for a camera and a camera.

BACKGROUND

At present, an electronic anti-shake is commonly used in cameras with anti-shake function, such as cameras in the security field. The electronic anti-shake is actually a technology for compensating for shake through the reduction of image quality. The anti-shake frequency of the electronic anti-shake is limited by a frame rate of image, thus the electronic anti-shake cannot perform anti-shake processing for the higher or lower frequency shake, resulting in an unsatisfactory anti-shake performance.

SUMMARY

The objective of embodiments of the present application is to provide an anti-shake method for a camera and a camera to improve the anti-shake performance. Specifically, the following specific technical solutions are provided.

An embodiment of the present application provides an anti-shake method for a camera. The camera includes: a lens including a movable anti-shake lens, a shake detector and an image sensor. The method includes:

acquiring current shake data of the camera, wherein the shake data includes position change data of the camera when the camera shakes, and the shake data is detected by the shake detector;

determining movement data of the anti-shake lens, based on a preset relationship between position change of the anti-shake lens for shake compensation and shake data; and adjusting the position of the anti-shake lens based on the movement data, so as to cause the image sensor to capture a shake-compensated image.

Optionally, the step of acquiring current shake data of the camera includes: acquiring the current shake data of the camera according to preset periods;

the position change data is an angle variation of the camera in a current period relative to a previous period;

before the step of determining movement data of the anti-shake lens based on a preset relationship between position change of the anti-shake lens for shake compensation and shake data, the method further includes:

determining whether the camera shakes continuously in a preset number of periods or whether the camera is standstill continuously in the preset number of periods based on the angle variation, a preset shake threshold and a preset standstill threshold, and enabling or disabling the anti-shake function based on a determination result;

when the anti-shake function is enabled, preforming the step of determining movement data of the anti-shake lens based on a preset relationship between position change of the anti-shake lens for shake compensation and shake data.

Optionally, the step of determining whether the camera shakes continuously in a preset number of periods or whether the camera is standstill continuously in the preset number of periods based on the angle variation, a preset shake threshold and a preset standstill threshold, and enabling or disabling the anti-shake function based on a determination result, includes:

obtaining a first camera state determined in the previous period; wherein, the camera state includes: a standstill state or a shake state;

when the first camera state is the standstill state:

determining and recording whether the camera shakes in the current period, based on the preset shake threshold and the angle variation;

determining whether the camera shakes continuously in the preset number of periods; if the camera shakes continuously in the preset number of periods, determining that a second camera state of the camera in the current period is the shake state, and enabling the anti-shake function; if the camera does not shake continuously in the preset number of periods, determining that the second camera state of the camera in the current period is the standstill state, and remaining the anti-shake function disabled; and when the first camera state is the shake state:

determining and recording whether the camera is standstill in the current period, based on the preset standstill threshold and the angle variation;

determining whether the camera is standstill continuously in the preset number of periods; if the camera is standstill continuously in the preset number of periods, determining that the second camera state of the camera in the current period is the standstill state, and disabling the anti-shake function; if the camera is not standstill continuously in the preset number of periods, determining that the second camera state of the camera in the current period is the shake state and remaining the anti-shake function enabled.

Optionally, the step of determining and recording whether the camera shakes in the current period, based on the preset shake threshold and the angle variation, includes:

determining whether the angle variation is greater than the preset shake threshold; if the angle variation is greater than the preset shake threshold, determining that the camera shakes in the current period, and recording the number of times that the camera shakes; if the angle variation is not greater than the preset shake threshold, determining that the camera does not shake, and resetting the number of times that the camera shakes;

the step of determining and recording whether the camera is standstill in the current period, based on the preset standstill threshold and the angle variation, includes:

determining whether the angle variation is less than the preset standstill threshold; if the angle variation is less than the preset standstill threshold, determining that the camera is standstill in the current period, and recording the number of times that the camera is standstill; if the angle variation is not less than the preset standstill threshold, determining that the camera is not standstill in the current period, and resetting the number of times that the camera is standstill.

Optionally, the preset relationship between position change of the anti-shake lens for shake compensation and shake data includes: a correspondence between the angle variation and a compensation vector of the anti-shake lens under a preset focal length;

the step of determining movement data of the anti-shake lens based on a preset relationship between position change of the anti-shake lens for shake compensation and shake data includes:

determining a movement direction and a movement distance of the anti-shake lens based on the correspondence between the angle variation and the compensation vector of anti-shake lens under the preset focal length;

the step of adjusting a position of the anti-shake lens based on the movement data, so as to cause the image sensor to capture a shake-compensated image includes:

adjusting the position of the anti-shake lens based on the determined movement direction and the determined movement distance of the anti-shake lens, so as to cause the image sensor to capture a shake-compensated image.

Optionally, the shake detector is a gyroscope;

the step of acquiring current shake data of the camera, includes:

receiving current angular velocity data sent by the gyroscope;

calculating the angle variation of the camera in the current period relative to the previous period, based on the length of the preset period.

Optionally, the method further includes:

receiving an operation instruction for enabling the anti-shake function or disabling the anti-shake function from a user;

enabling or disabling the anti-shake function based on the operation instruction; and/or receiving and saving an anti-shake level set by the user; wherein, the anti-shake level includes: the shake threshold and/or the standstill threshold.

An embodiment of the present application further provides an anti-shake apparatus for a camera. The camera includes: a lens including a movable anti-shake lens, a shake detector and an image sensor. The apparatus includes:

a shake acquisition module, configured for acquiring current shake data of the camera, wherein the shake data includes position change data of the camera when the camera shakes, and the shake data is detected by the shake detector;

a data determination module, configured for determining movement data of the anti-shake lens, based on a preset relationship between position change of the anti-shake lens for shake compensation and shake data;

a position adjustment module, configured for adjusting the position of the anti-shake lens based on the movement data, so as to cause the image sensor to capture a shake-compensated image.

Optionally, the shake acquisition module is specifically configured for acquiring the current shake data of the camera according to preset periods;

the position change data is an angle variation of the camera in a current period relative to a previous period;

the apparatus further includes:

an anti-shake function enabling and disabling module is configured for determining whether the camera shakes continuously in a preset number of periods or whether the camera is standstill continuously in the preset number of periods based on the angle variation, a preset shake threshold and a preset standstill threshold, and enabling or disabling the anti-shake function based on a determination result;

when the anti-shake function is enabled, triggering the data determination module.

Optionally, the anti-shake function enabling and disabling module includes:

a first camera state acquisition sub-module, configured for obtaining a first camera state determined in the previous period; wherein, the camera state includes: a standstill state or a shake state;

a first standstill state determination sub-module, configured for, when the first camera state is the standstill state:

determining and recording whether the camera shakes in the current period, based on the preset shake threshold and the angle variation;

a second standstill state determination sub-module, configured for determining whether the camera shakes continuously in the preset number of periods; if the camera shakes continuously in the preset number of periods, determining that a second camera state of the camera in the current period is the shake state, and enabling the anti-shake function; if the camera does not shake continuously in the preset number of periods, determining that the second camera state of the camera in the current period is the standstill state, and remaining the anti-shake function disabled;

a first shake state determination sub-module, configured for, when the first camera state is the shake state:

determining and recording whether the camera is standstill in the current period, based on the preset standstill threshold and the angle variation;

a second shake state determination sub-module, configured for determining whether the camera is standstill continuously in the preset number of periods; if the camera is standstill continuously in the preset number of periods, determining that the second camera state of the camera in the current period is the standstill state, and disabling the anti-shake function; if the camera is not standstill continuously in the preset number of periods, determining that the second camera state of the camera in the current period is the shake state and remaining the anti-shake function enabled.

Optionally, the first standstill state determination sub-module is specifically configured for:

determining whether the angle variation is greater than the preset shake threshold; if the angle variation is greater than the preset shake threshold, determining that the camera shakes in the current period, and recording the number of times that the camera shakes; if the angle variation is not greater than the preset shake threshold, determining that the camera does not shake, and resetting the number of times that the camera shakes;

the first shake state determination sub-module is specifically configured for:

determining whether the angle variation is less than the preset standstill threshold; if the angle variation is less than the preset standstill threshold, determining that the camera is standstill in the current period, and recording the number of times that the camera is standstill; if the angle variation is not less than the preset standstill threshold, determining that the camera is not standstill in the current period, and resetting the number of times that the camera is standstill.

Optionally, the preset relationship between position change of the anti-shake lens for shake compensation and shake data includes: a correspondence between the angle variation and a compensation vector of the anti-shake lens under a preset focal length;

the data determination module is specifically configured for:

determining a movement direction and a movement distance of the anti-shake lens, based on the correspondence between the angle variation and the compensation vector of anti-shake lens under the preset focal length;

the position adjustment module is specifically configured for:

adjusting the position of the anti-shake lens based on the determined movement direction and the determined movement distance of the anti-shake lens, so as to cause the image sensor to capture a shake-compensated image.

Optionally, the shake detector is a gyroscope;

the shake acquisition module includes:

a reception sub-module, configured for receiving current angular velocity data sent by the gyroscope;

a calculation sub-module, configured for calculating the angle variation of the camera in the current period relative to the previous period, based on the length of the preset period.

Optionally, the apparatus further includes:

a reception module, configured for receiving an operation instruction for enabling the anti-shake function or disabling the anti-shake function from a user;

an anti-shake enabling and disabling module, configured for enabling or disabling the anti-shake function based on the operation instruction; and/or an anti-shake setting module, configured for receiving and saving an anti-shake level set by the user; wherein, the anti-shake level includes: the shake threshold and/or the standstill threshold.

An embodiment of the present application further provides a camera, including: a lens including a movable anti-shake lens, a shake detector, an image sensor and a first processor; wherein, the lens is configured for optical framing;

the shake detector is configured for detecting current shake data of the camera;

the image sensor is configured for capturing an image; and the first processor is configured for acquiring current shake data of the camera, wherein the shake data includes position change data of the camera when the camera shakes, and the shake data is detected by the shake detector; determining movement data of the anti-shake lens, based on a preset relationship between position change of the anti-shake lens for shake compensation and shake data; and adjusting the position of the anti-shake lens based on the movement data, so as to cause the image sensor to capture a shake-compensated image.

Optionally, the shake detector is specifically configured for acquiring the current shake data of the camera according to preset periods;

the position change data is an angle variation of the camera in a current period relative to a previous period;

the first processor is specifically configured for:

determining whether the camera shakes continuously in a preset number of periods or whether the camera is standstill continuously in the preset number of periods based on the angle variation, a preset shake threshold and a preset standstill threshold, and enabling or disabling the anti-shake function based on a determination result;

when the anti-shake function is enabled, determining the movement data of the anti-shake lens based on the preset relationship between position change of the anti-shake lens for shake compensation and shake data.

Optionally, the camera further includes: a second processor configured for:

receiving an operation instruction for enabling the anti-shake function or disabling the anti-shake function from a user;

sending an instruction for enabling or disabling the anti-shake function to the first processor based on the operation instruction; and/or receiving an anti-shake level set by the user, and sending the anti-shake level to the first processor to be saved; wherein, the anti-shake level includes: the shake threshold and/or the standstill threshold.

The embodiment of the present application provides a storage medium, configured for storing executable code; wherein, the executable code, when being executed, performs the anti-shake method for a camera according to the embodiment of the present application.

The embodiment of the present application provides an application program which, when being executed, performs the anti-shake method for a camera according to the embodiment of the present application.

In the anti-shake method for a camera and a camera provided by embodiments of the present application, the current shake data of the position change of the camera is acquired by the shake detector. The movement data of the anti-shake lens is determined based on the preset relationship between position change of the anti-shake lens for shake compensation and shake data. The position of the anti-shake lens is adjusted based on the movement data, so that the image sensor captures a shake-compensated image. The present application achieves the anti-shake function by the position movement of the anti-shake lens, which is different from the electronic anti-shake in prior art, which achieves the anti-shake function by processing the image. The anti-shake method according to the embodiment of the present application is not limited by the frame rate of the image, and can perform anti-shake processing for the higher or lower frequency shake, improving the anti-shake performance. Of course, any one of the products or methods implementing the present application does not necessarily achieve all of the advantages described above at the same time.

The embodiment of the present application discloses a surveillance camera which can capture a clear surveillance video when the surveillance camera shakes.

To achieve the above-mentioned objective, the embodiment of the present application discloses a surveillance camera; and the surveillance camera includes: a shake detector, a system on chip (SOC), an optical anti-shake lens including a set of movable optical anti-shake compensation lenses, a motor driver and a photosensitive sensor.

The shake detector is electrically connected to the SOC, and sends a shake signal to the SOC.

The SOC is electrically connected to the shake detector, the motor driver and the photosensitive sensor, respectively, and receives the shake signal sent by the shake detector, and sends a control signal to the motor driver and the photosensitive sensor based on the shake signal.

The motor driver is connected to the SOC and the set of optical anti-shake compensation lenses, and receives the control signal sent by the SOC to drive the set of optical anti-shake compensation lenses to move.

The photosensitive sensor is located in rear of the optical anti-shake lens, and receives the control signal sent by the SOC, and captures light passing through the optical anti-shake lens to form a shake-compensated image.

In an implementation of the present application, the optical anti-shake lens further includes: a set of photosensitive lenses; wherein, the set of photosensitive lenses is located in front of the set of optical anti-shake compensation lenses;

the photosensitive sensor is located in rear of the set of optical anti-shake compensation lenses.

In an implementation of the present application, the set of photosensitive lenses include: a set of magnifying lenses and a set of focusing lenses; wherein, the set of focusing lenses are located in rear of the set of magnifying lenses, and in front of the set of optical anti-shake compensation lenses.

In an implementation of the present application, the set of magnifying lenses include at least two lenses.

In an implementation of the present application, the set of focusing lenses include at least two lenses.

In an implementation of the present application, the motor driver includes: a motor driving chip and an optical compensation motor; wherein, the motor driving chip is electrically connected to the SOC and the optical compensation motor, respectively;

the optical compensation motor is connected to the set of optical anti-shake compensation lenses to drive the set of optical anti-shake compensation lenses to move.

In an implementation of the present application, the shake detector is a gyroscope.

In an implementation of the present application, the surveillance camera includes at least two optical anti-shake lenses;

the number of the photosensitive sensors is equal to the number of the optical anti-shake lenses.

It can be seen that the surveillance camera according to the embodiments includes: a shake detector, an SOC, an optical anti-shake lens including a set of movable optical anti-shake compensation lenses, a motor driver and a photosensitive sensor. The shake detector sends a shake signal to the SOC connected thereto. The SOC may send a control signal to the motor driver and the photosensitive sensor connected thereto based on the shake signal. The motor driver, after receiving the control signal, drives the set of optical anti-shake compensation lenses in the optical anti-shake lens connected thereto to move, thereby adjusting the focus of the light passing through the optical anti-shake lens on the photosensitive sensor to obtain a shake-compensated image. Therefore, the surveillance camera according to the various embodiments of the present application can capture a clear surveillance video when the surveillance camera shakes.

BRIEF DESCRIPTION OF THE DRAWINGS

In order to more clearly describe the technical solutions of the embodiments of the present application and the prior art, drawings that need to be used in embodiments and the prior art will be briefly described below. Obviously, the drawings described below are for only some embodiments of the present application; those skilled in the art can also obtain other drawings based on these drawings without any creative efforts.

DETAILED DESCRIPTION

In order to make the objectives, technical solutions, and advantages of the present application clearer and more understandable, the present application will be described in more detail below with reference to the appended drawings and embodiments. Obviously, the described embodiments are only some, and not all, of the embodiments of the present application. All other embodiments obtained based on the embodiments of the present application by those skilled in the art without any creative efforts fall into the scope of protection defined by the present application.

Embodiments of the application disclose an anti-shake method for a camera and a camera, which can improve the anti-shake performance. An anti-shake method for a camera according to an embodiment of the present application is firstly introduced below.

At present, cameras have been widely used in a motion photograph, security, traffic surveillance and other fields. In order to obtain a clearer and more reliable image, a camera is required to have anti-shake performance. At present, the electronic anti-shake is commonly used in the camera. The electronic anti-shake is a technology for analyzing images on a CCD and then using edge images for shake compensation. The electronic anti-shake is actually a technology for compensating for shake through the reduction of image quality. The anti-shake frequency of the electronic anti-shake is limited by a frame rate at which an image is captured, thus the electronic anti-shake cannot perform anti-shake processing for the higher or lower frequency shake, resulting in an unsatisfactory anti-shake performance.

The present application provides an anti-shake method for a camera. A movable anti-shake lens is included in the camera lens. An optical anti-shake is implemented by the cooperation of the anti-shake lens, a shake detector and an image sensor.

Figure 1:
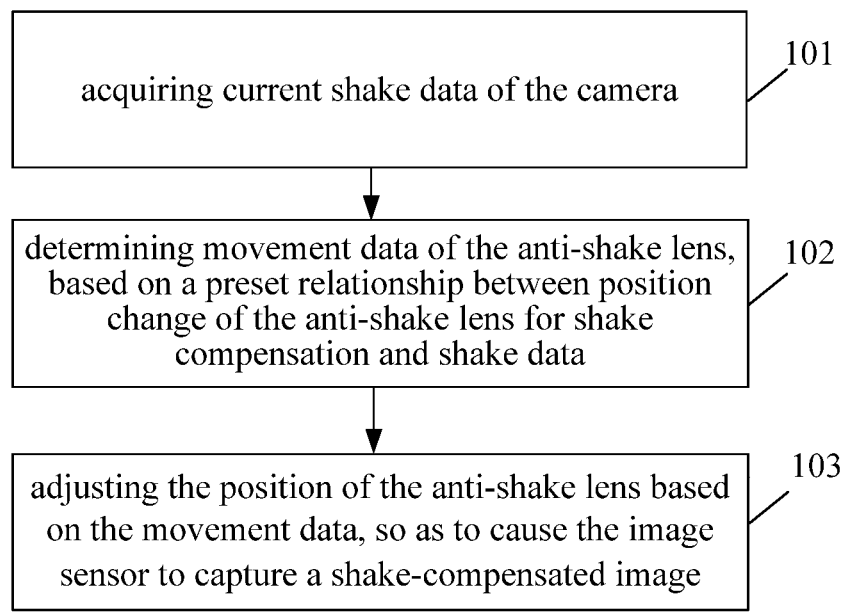
FIG. 1 shows a flowchart of an anti-shake method for a camera according to an embodiment of the present application.

Referring to FIG. 1, FIG. 1 shows a flowchart of an anti-shake method for a camera according to an embodiment of the present application. The method includes 101-103.

101: acquiring current shake data of the camera by a shake detector.

The position of the camera changes when the camera shakes. A value obtained by quantifying the degree of shake of the camera is taken as the shake data.

The shake data includes position change data of the camera when the camera shakes. The change in position of the camera includes the change in angle of the camera.

Current shake data is shake data of the camera at the current time. The shake data is detected by the shake detector.

102: determining movement data of an anti-shake lens, based on current shake data of the camera and a preset relationship between position change of the anti-shake lens for shake compensation and shake data. The movement data of the anti-shake lens is position change data of the anti-shake lens.

The preset relationship between position change of the anti-shake lens for shake compensation and shake data is obtained in advance based on the relationship between positions of the shake detector and the anti-shake lens of the camera, the relationship between the shake direction and the movement direction of the anti-shake lens, and the relationship between the focal length, shake distance and shake angle and the movement distance of the anti-shake lens. The preset relationship can be expressed in a formula or a table. According to the preset relationship, it is possible to acquire movement data, corresponding to any shake data, of the anti-shake lens for shake compensation. The movement data includes a movement direction and a movement distance. In other words, the position change data includes a direction of position change and a distance of position change.

It should be noted that the anti-shake lens may move in four directions including up, down, left, and right directions.

103: adjusting the position of the anti-shake lens based on the movement data, so as to cause an image sensor to capture a shake-compensated image.

The position of the anti-shake lens is determined based on the movement data. The anti-shake lens is moved to the determined position to complete an anti-shake compensation movement, so that the image sensor captures the shake-compensated image. Therefore, an anti-shake capturing picture can be obtained.

In the anti-shake method for a camera according to the embodiment of the present application, the current shake data of the position change of the camera is acquired by the shake detector. The movement data of the anti-shake lens is determined based on the preset relationship between position change of the anti-shake lens for shake compensation and shake data. The position of the anti-shake lens is adjusted based on the movement data, so that the image sensor captures a shake-compensated image. The present application achieves the anti-shake function by the position movement of the anti-shake lens, which is different from the electronic anti-shake in prior art, which achieves the anti-shake function by processing the image. The anti-shake method according to the embodiment of the present application is not limited by the frame rate of the image, and can perform anti-shake processing for the higher or lower frequency shake, improving the anti-shake performance.

Figure 2:
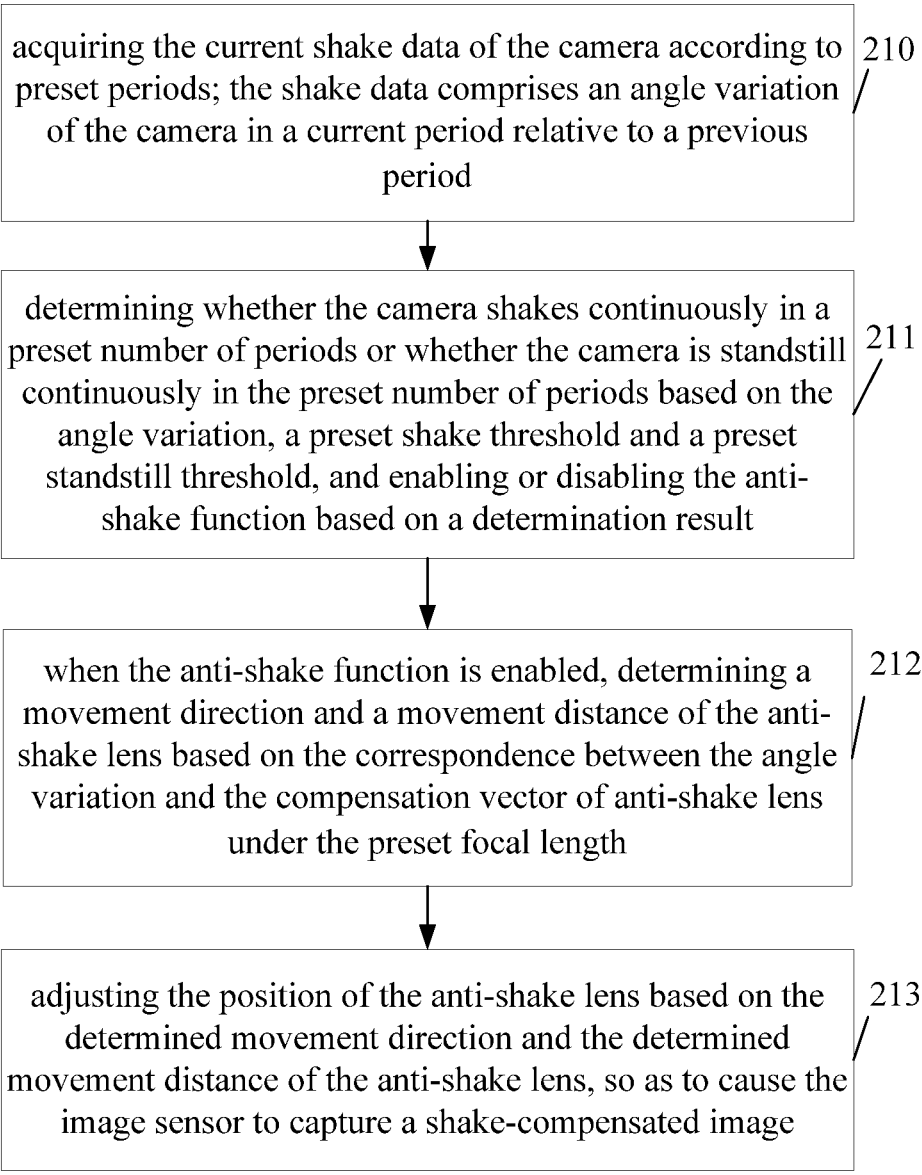
FIG. 2 shows another flowchart of an anti-shake method for a camera according to an embodiment of the present application.

As another embodiment, FIG. 2 shows another flowchart of an anti-shake method for a camera according to an embodiment of the present application. The method includes steps 210-213.

At step 210, the current shake data of the camera is acquired based on preset periods. In other words, for each of preset periods, the current shake data of the camera is acquired by the shake detector.

The shake data includes position change data of the camera when the camera shakes. The position change data is the angle variation of the camera in the current period relative to the previous period.

The shake data is detected by the shake detector. The shake detector is a gyroscope.

The preset period in microseconds is a shake detection period of the camera set based on industrial requirements or set manually.

Step 210 specifically includes the following steps.

In the first step, current angular velocity data sent by the gyroscope is received.

The gyroscope is used for detecting the shake and sending the angular velocity data, which belongs to the prior art, and will not be described herein.

In the second step, the angle variation of the camera in the current period relative to the previous period is calculated, based on the length of the preset period, the current angular velocity data, and angular velocity data received in the previous period.

The second step specifically includes: calculating the integral of the current angular velocity data at the preset period as a time period, to obtain the angle variation of the camera in the current period relative to the previous period. The calculation of the integral at a time period belongs to the prior art, and will not be described herein.

At step 211, whether the camera shakes continuously in the preset number of periods or whether the camera is standstill continuously in the preset number of periods is determined based on the angle variation, a preset shake threshold and a preset standstill threshold, and the anti-shake function is enabled or disabled based on a determination result.

In other words, whether the camera shakes continuously in the preset number of periods is determined based on the shake data of the camera in the preset number of periods, the preset shake threshold and the preset standstill threshold, and if the camera shakes continuously in the preset number of periods, the anti-shake function is enabled.

It can be understood that in implementing the embodiment shown in FIG. 2 during each preset period, step 210 is first performed, and then step 211 is performed; if the anti-shake function is enabled in step 211, step 212 and step 213 are performed; and if the anti-shake function is disabled in step 211, step 212 and step 213 are not performed.

Specifically, step 211 may include:

determining a first camera state of the camera in a previous period of the current period, wherein the camera state includes: a standstill state or a shake state.

For ease of description, the state of the camera in a previous period for the current period is called as a first camera state, and the state of the camera in the current period is called as a second camera state.

When the first camera state is a standstill state:

determining whether the camera shakes in the current period, based on the preset shake threshold and the angle variation included in the shake data of the camera in the current period;

determining whether the camera shakes continuously in the preset number of periods; if the camera shakes continuously in the preset number of periods, determining that the second camera state of the camera in the current period is the shake state, and enabling the anti-shake function; if the camera does not shake continuously in the preset number of periods, determining that the second camera state of the camera in the current period is the standstill state, and remaining the shake function disabled.

When the first camera state is a shake state:

determining whether the camera is standstill in the current period, based on the preset standstill threshold and the angle variation included in the shake data of the camera in the current period;

determining whether the camera is standstill continuously in the preset number of periods; if the camera is standstill continuously in the preset number of periods, determining that the second camera state of the camera in the current period is the standstill state, and enabling the anti-shake function; if the camera is not standstill continuously in the preset number of periods, determining that the second camera state of the camera in the current period is the shake state, and remaining the shake function enabled.

The shake threshold and the standstill threshold are a shake determination threshold and a standstill determination threshold of the camera set based on industrial requirements or set manually. In the embodiment of the present application, the shake threshold is represented by A, and the standstill threshold is represented by B.

Figure 3:
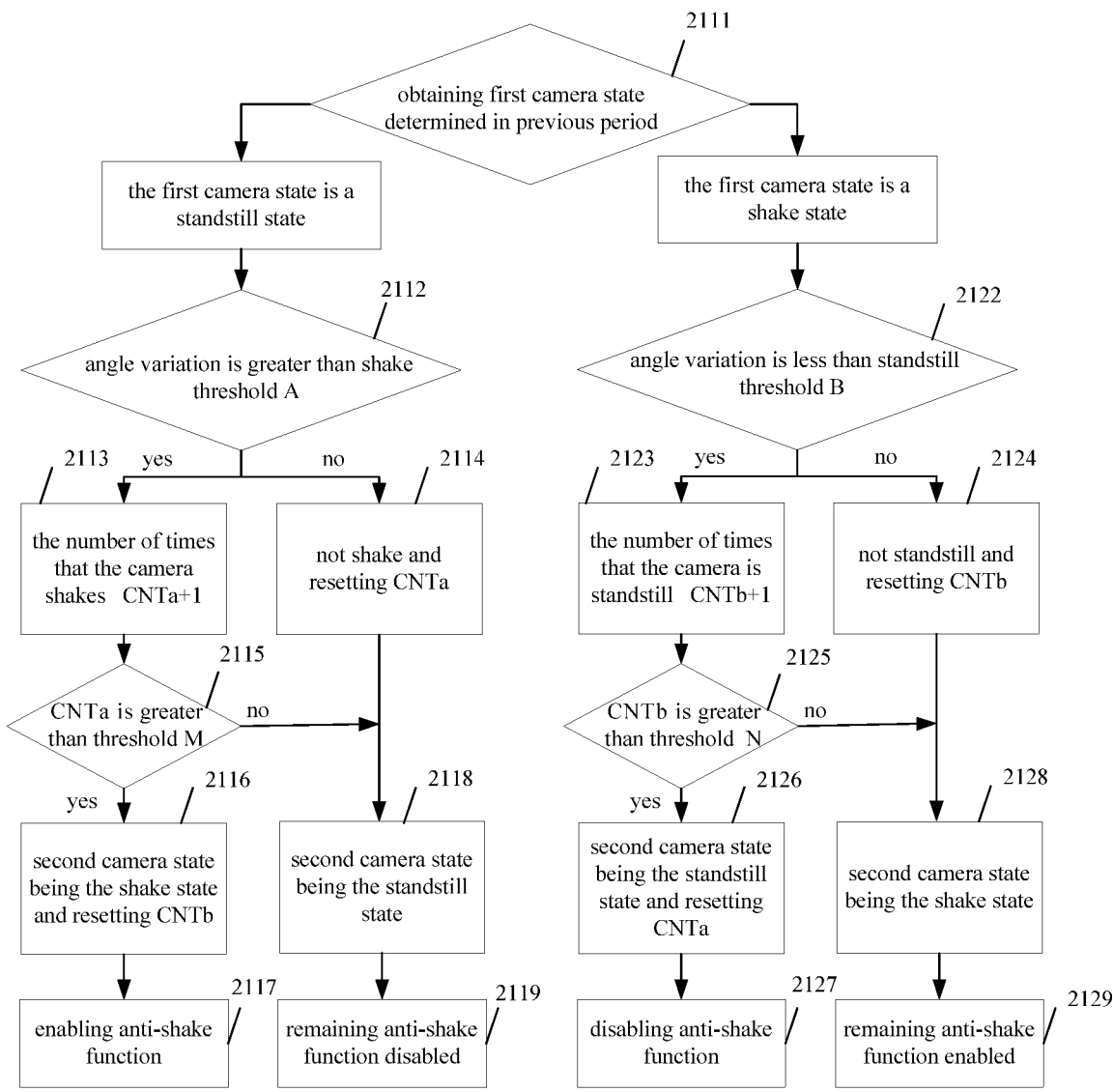
FIG. 3 shows a specific flowchart of S211 shown in FIG. 2.

Referring to FIG. 3, FIG. 3 is a specific flowchart of step 211 shown in FIG. 2. Step 211 includes the following steps.

At step 2111, the first camera state determined in the previous period is obtained; that is, the first camera state of the camera in the previous period of the current period is determined, wherein the camera state includes a standstill state or a shake state.

In the embodiment shown in FIG. 2, for ease of description, the state of the camera in a previous period of the current period is called as a first camera state, and the state of the camera in the current period is called as a second camera state.

When the first camera state is a standstill state, step 2112 is performed.

At step 2112, it is determined whether the angle variation included in the shake data of the camera in the current period is greater than the preset shake threshold. If yes, step 2113 is performed. At step 2113, it is determined that the camera shakes in the current period, and the number of times that the camera shakes is recorded. The number of times that the camera shakes is recorded by a shake counter CNTa, as CNTa+1 at this time. After step 2113, step 2115 is performed. If the angle variation included in the shake data of the camera in the current period is not greater than the preset shake threshold, step 2114 is performed. At step 2114, it is determined that no shakes occur, and the number of times that the camera shakes CNTa is reset. After step 2114, step 2118 is performed and then step 2119 is performed. At step 2118, it is determined that the second camera state of the camera in the current period is the standstill state. At step 2119, the anti-shake function remains disabled.

At step 2115, it is determined whether the camera shakes in the preset number of periods. Specifically, whether the CNTa is greater than the threshold M is determined, wherein M is a positive integer greater than 0. If the CNTa is greater than the threshold M, step 2116 is performed. At step 2116, it is determined that the second camera state of the camera in the current period is the shake state, and the number of times that the camera is standstill CNTb is reset. Next, Step 2117 is performed. At step 2117, the anti-shake function enabled. If CNTa is not greater than the threshold M, step 2118 is performed. At step 2118, it is determined that the second camera state of the camera in the current period is the standstill state. Next, step 2119 is performed. At step 2119, the anti-shake function remains disabled.

When the first camera state is a shake state, step 2122 is performed.

At step 2122, it is determined whether the angle variation included in the shake data of the camera in the current period is less than the preset standstill threshold. If the angle variation included in the shake data of the camera in the current period is less than the preset standstill threshold, step 2123 is performed. At step 2123, it is determined that the camera is standstill in the current period, and the number of times that the camera is standstill is recorded. The number of times that the camera is standstill is recorded by a standstill counter CNTb, as CNTb+1 at this time. After step 2123, step 2125 is performed. If the angle variation included in the shake data of the camera in the current period is not less than the preset standstill threshold, step 2124 is performed. At step 2124, it is determined that the camera is not standstill in the current period, and the number of times that the camera is standstill CNTb is reset. After step 2124, step 2128 is performed. At step 2128, it is determined that the second camera state of the camera in the current period is the shake state. Next, step 2129 is performed. At step 2129, the anti-shake function remains enabled.

At step 2125, it is determined whether the camera is standstill continuously in the preset number of periods. Specifically, whether the CNTb is greater than the threshold N is determined, wherein N is a positive integer greater than 0. If the CNTb is greater than the threshold N, step 2126 is performed. At step 2126, it is determined that the second camera state of the camera in the current period is the standstill state, and the number of times that the camera shakes CNTa is reset. Next, step 2127 is performed. At step 2127, the anti-shake function is disabled. If the CNTb is not greater than the threshold N, step 2128 is performed. At step 2128, it is determined that the second camera state of the camera in the current period is the shake state. Next, step 2129 is performed. At step 2129, the anti-shake function remains enabled.

A and B are natural numbers greater than 0. In the solution of the embodiment of the present application, A≥B indicates that the shake determination threshold, which is used to determine the camera to change to the shake state from the standstill state, is greater than or equal to the standstill determination threshold, which is used to determine the camera to change to the standstill state from the shake state. A may be understood as a degree of violent shake in the standstill state. B may be understood as a degree of slight shake in the shake state. M and N are positive integers greater than 0. M and N may be the same or different values. M may be understood as the accumulated number of continuously violent shakes in the standstill state, and N may be understood as the accumulated number of continuously slight shakes in the shake state.

When the anti-shake function is enabled in step 2117 and step 2129, step 212 is performed.

At step 212, when the anti-shake function is enabled, the movement data of the anti-shake lens is determined, based on the preset relationship between position change of the anti-shake lens for shake compensation and shake data.

The preset relationship between the position change of the anti-shake lens for shake compensation and shake data includes: the correspondence between the angle variation of the camera and the compensation vector of anti-shake lens under a preset focal length. Therefore, step 212 specifically includes: when the anti-shake function is enabled, based on the correspondence between the angle variation and the compensation vector of anti-shake lens under the current focal length, determining the movement direction and the movement distance of the anti-shake lens, that is, determining the direction of the position change and the distance of the position change of the anti-shake lens.

For example, the correspondence between the angle variation of the camera and the compensation vector of anti-shake lens under the preset focal length is illustrated below. Table 1 is an example table of the correspondence between the angle variation of the camera and the compensation vector of anti-shake lens under the preset focal length, as follows:

TABLE 1

|  | example 1 | example 2 | example 3 | example 4 |
| --- | --- | --- | --- | --- |
| focal length | 50 mm | 50 mm | 100 mm | 100 mm |
| angle variation | upward displacement of 0.44° | downward displacement of 0.89° | upward displacement of 0.18° | downward displacement of 0.35° |
| compensation vector of anti-shake lens | downward compensation of 0.4 mm | upward compensation of 0.8 mm | downward compensation of 0.4 mm | upward compensation of 0.8 mm |

At step 213, the position of the anti-shake lens is adjusted based on the determined movement direction and movement distance of the anti-shake lens, so as to cause the image sensor to capture a shake-compensated image.

After the step 213, the anti-shake method according to the embodiment of the present application further includes:

performing a conversion and match operation on a picture captured by the image sensor, so that the captured picture is close to a picture seen by the human eye. The conversion and match operation includes various operations that enhance the definition and quality of the picture, such as noise elimination, red-eye elimination, contrast adjustment, and chromatic aberration adjustment.

In addition to the above steps, the anti-shake method according to the embodiment of the present application further includes:

receiving an operation instruction for enabling or disabling the anti-shake function from a user;

enabling or disabling the anti-shake function based on the operation instruction; and/or, receiving and saving an anti-shake level set by the user, wherein the anti-shake level includes the shake threshold and/or the standstill threshold.

In addition to the above steps, the anti-shake method according to the embodiment of the present application further includes:

receiving one or more of an operation instruction for enabling the anti-shake function, an operation instruction for disabling the anti-shake function and an instruction for setting the anti-shake level, sent by a user;

if the operation instruction for enabling the anti-shake function is received from the user, enabling the anti-shake function;

if the operation instruction for disabling the anti-shake function is received from the user, disabling the anti-shake function; and if the instruction for setting the anti-shake level is received from the user, reading and saving an anti-shake level carried in the instruction for setting the anti-shake level, wherein the anti-shake level includes the shake threshold and/or the standstill threshold.

It can be understood that in implementing the embodiment shown in FIG. 2 during each preset period, step 210 is first performed, and then step 211 is performed; if the anti-shake function is enabled in step 211, step 212 and step 213 are performed; and if the anti-shake function is disabled in step 211, step 212 and step 213 are not performed.

It should be noted that the user may set different anti-shake levels, that is, the user may change the value of the shake threshold A or the standstill threshold B. The smaller the value of A or B is, the higher anti-shake level is.

It can be seen that in the anti-shake method for a camera according to the embodiment of the present application, the current shake data of the camera is acquired through the gyroscope; whether the camera shakes continuously in the preset number of periods or whether the camera is standstill continuously in the preset number of periods is determined by comparing the angle variation of the current shake data with the preset shake threshold or the standstill threshold based on the first camera state determined in the previous period, and the anti-shake function is enabled or disabled based on a determination result. When the anti-shake function is enabled, the movement direction and the movement distance of the anti-shake lens are determined based on the correspondence between the angle variation and the compensation vector of anti-shake lens under the current focal length. The position of the anti-shake lens is adjusted based on the determined movement direction and movement distance of the anti-shake lens, so that the image sensor captures the shake-compensated image. With the embodiment of the present application, the anti-shake performance can be improved. Furthermore, in the embodiment of the present application, when the anti-shake function is enabled, it can be determined through state that when the angle variation of the camera remains less than the standstill threshold for a time threshold N, the anti-shake function is disabled. Therefore, according to the embodiment of the present application, the working time of the anti-shake component can be reduced and thus the service life of the anti-shake component is improved.

Figure 4:
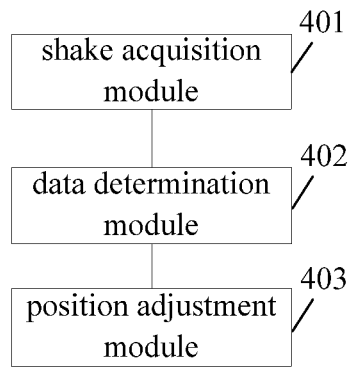
FIG. 4 shows a structural diagram of an anti-shake apparatus for a camera according to an embodiment of the present application.

Referring to FIG. 4, FIG. 4 shows a structural diagram of an anti-shake apparatus for a camera according to an embodiment of the present application. The apparatus includes:

a shake acquisition module 401, configured for acquiring current shake data of the camera by the shake detector, wherein the shake data comprises position change data of the camera when the camera shakes;

a data determination module 402, configured for determining movement data of the anti-shake lens, based on a preset relationship between position change of the anti-shake lens for shake compensation and shake data;

a position adjustment module 403, configured for adjusting a position of the anti-shake lens based on the movement data, so as to cause the image sensor to capture a shake-compensated image.

With the anti-shake apparatus for a camera according to the embodiment of the present application, the current shake data of the position change of the camera is acquired by the shake detector. The movement data of the anti-shake lens is determined based on the preset relationship between the position change of the anti-shake lens for shake compensation and the shake data. The position of the anti-shake lens is adjusted based on the movement data, so that the image sensor captures a shake-compensated image. The present application achieves the anti-shake function by the position movement of the anti-shake lens, which is different from the electronic anti-shake in prior art, which achieves the anti-shake function by processing the image. The anti-shake method according to the embodiment of the present application is not limited by the frame rate of the image, and can perform anti-shake processing for the higher or lower frequency shake, improving the anti-shake performance.

It should be noted that the apparatus in the embodiment of the present application is an apparatus using the above-described anti-shake method for a camera, and all embodiments of the above-described method are applicable to the apparatus, and the apparatus can achieve the same or similar beneficial effects.

Figure 5:
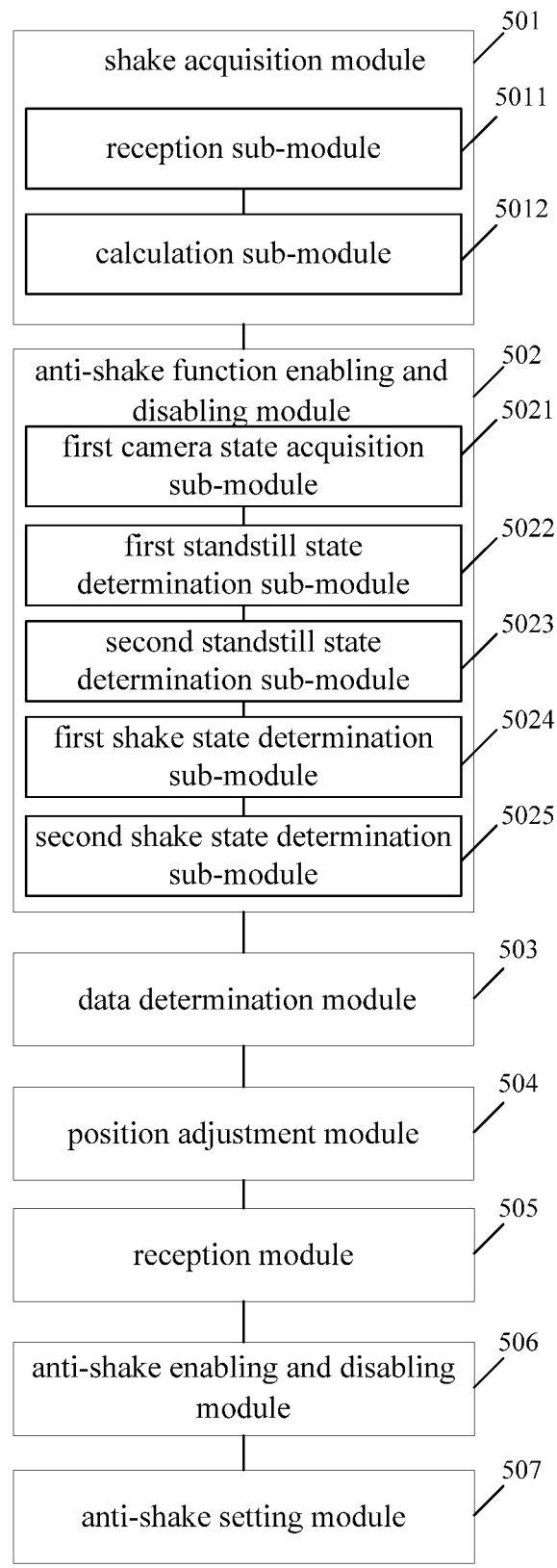
FIG. 5 shows another structural diagram of an anti-shake apparatus for a camera according to an embodiment of the present application.

As another embodiment, FIG. 5 shows another structural diagram of an anti-shake apparatus for a camera according to an embodiment of the present application. The apparatus include a shake acquisition module 501, an anti-shake function enabling and disabling module 502, a data determination module 503, a position adjustment module 504, a reception module 505, an anti-shake enabling and disabling module 506 and/or an anti-shake setting module 507.

The shake acquisition module 501 is configured for acquiring the current shake data of the camera based on preset periods.

The shake data includes position change data of the camera when the camera shakes. The position change data is the angle variation of the camera in the current period relative to the previous period.

The shake data is detected by the shake detector. The shake detector is a gyroscope.

The shake acquisition module 501 includes:
a reception sub-module 5011, configured for receiving current angular velocity data sent by the gyroscope; and
a calculation sub-module 5012, configured for calculating the angle variation of the camera in the current period relative to the previous period, based on the length of the preset period.

The anti-shake function enabling and disabling module 502 is configured for determining whether the camera shakes continuously in a preset number of periods or whether the camera is standstill continuously in the preset number of periods based on the angle variation, a preset shake threshold and a preset standstill threshold, and enabling or disabling the anti-shake function based on a determination result; and when the anti-shake function is enabled, triggering the data determination module 503.

The anti-shake function enabling and disabling module 502 includes sub-modules 5021-5025.

The first camera state acquisition sub-module 5021 is configured for obtaining a first camera state determined in the previous period; wherein, the camera state includes: a standstill state or a shake state;

The first standstill state determination sub-module 5022 is configured for, when the first camera state is the standstill state:
determining and recording whether the camera shakes in the current period, based on the preset shake threshold and the angle variation.

The first standstill state determination sub-module 5022 is specifically configured for:
determining whether the angle variation is greater than the preset shake threshold; if the angle variation is greater than the preset shake threshold, determining that the camera shakes in the current period, and recording the number of times that the camera shakes; if the angle variation is not greater than the preset shake threshold, determining that the camera does not shake, and resetting the number of times that the camera shakes.

The second standstill state determination sub-module 5023 is configured for determining whether the camera shakes continuously in the preset number of periods; if the camera shakes continuously in the preset number of periods, determining that the second camera state of the camera in the current period is the shake state, and enabling the anti-shake function; if the camera does not shake continuously in the preset number of periods, determining that the second camera state of the camera in the current period is the standstill state, and remaining the shake function disabled.

The first shake state determination sub-module 5024 is configured for, when the first camera state is the shake state:
determining and recording whether the camera is standstill in the current period, based on the preset standstill threshold and the angle variation.

The first shake state determination sub-module 5024 is specifically configured for:
determining whether the angle variation is less than the preset standstill threshold; if the angle variation is less than the preset standstill threshold, determining that the camera is standstill in the current period, and recording the number of times that the camera is standstill; if the angle variation is not less than the preset standstill threshold, determining that the camera is not standstill in the current period, and resetting the number of times that the camera is standstill.

The second shake state determination sub-module 5025 is configured for determining whether the camera is standstill continuously in the preset number of periods; if the camera is standstill continuously in the preset number of periods, determining that the second camera state of the camera in the current period is the standstill state, and disabling the anti-shake function; if the camera is not standstill continuously in the preset number of periods, determining that the second camera state of the camera in the current period is the shake state, and remaining the shake function enabled.

The preset relationship between position change of the anti-shake lens for shake compensation and shake data includes: a correspondence between the angle variation and a compensation vector of the anti-shake lens under a preset focal length.

The data determination module 503 is configured for:
determining the movement direction and the movement distance of the anti-shake lens, based on the correspondence between the angle variation and the compensation vector of the anti-shake lens under the preset focal length.

The position adjustment module 504 is configured for:
adjusting a position of the anti-shake lens based on the determined movement direction and movement distance of the anti-shake lens, so as to cause the image sensor to capture a shake-compensated image.

The reception module 505 is configured for receiving an operation instruction for enabling the anti-shake function or disabling the anti-shake function from a user.

The anti-shake enabling and disabling module 506 is configured for enabling or disabling the anti-shake function based on the operation instruction.

The anti-shake setting module 507 is configured for receiving and saving the anti-shake level set by the user. The anti-shake level includes: the shake threshold and/or the standstill threshold.

It can be seen that in the anti-shake apparatus for a camera according to the embodiment of the present application, the current shake data of the camera is acquired through the gyroscope; whether the camera shakes continuously in the preset number of periods or whether the camera is standstill continuously in the preset number of periods is determined by comparing the angle variation of the current shake data with the preset shake threshold or the standstill threshold based on the first camera state of the camera determined in the previous period, and the anti-shake function is enabled or disabled based on a determination result. When the anti-shake function is enabled, the movement direction and the movement distance of the anti-shake lens are determined based on the correspondence between the angle variation and the compensation vector of anti-shake lens under the current focal length. The position of the anti-shake lens is adjusted based on the determined movement direction and movement distance of the anti-shake lens, so that the image sensor captures the shake-compensated image. With the embodiment of the present application, the anti-shake performance can be improved. Furthermore, in the embodiment of the present application, when the anti-shake function is enabled, it can be determined through state that when the angle variation of the camera remains less than the standstill threshold for a time threshold N, the anti-shake function is disabled. Therefore, according to the embodiment of the present application, the working time of the anti-shake component can be reduced and thus the service life of the anti-shake component is improved.

Figure 6:
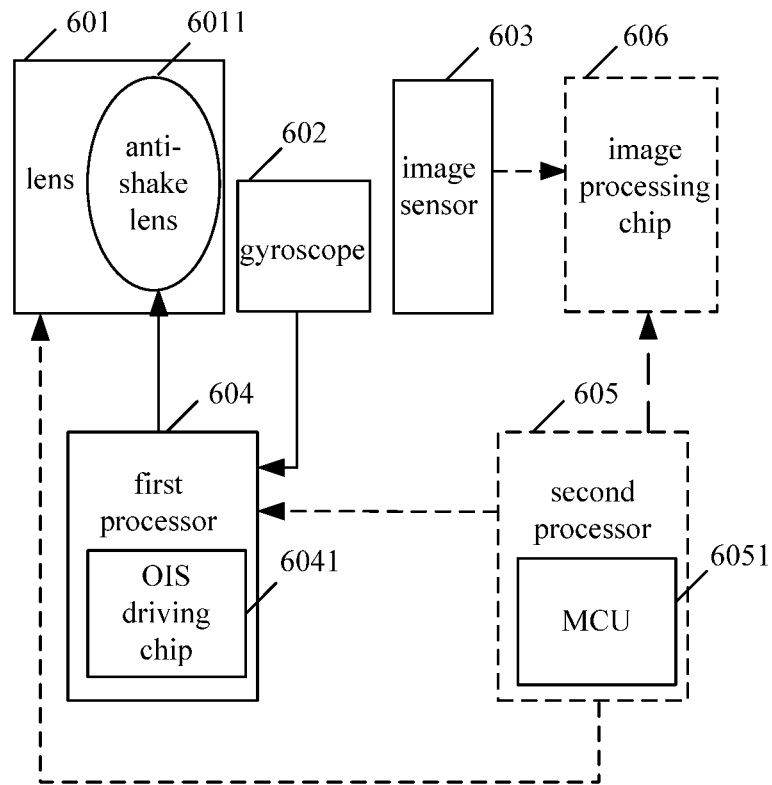
FIG. 6 shows a first structural diagram of a camera according to an embodiment of the present application.

Referring to FIG. 6, FIG. 6 shows a structural diagram of a camera according to an embodiment of the present application. The camera may include a lens 601, a shake detector (gyroscope) 602, an image sensor 603 and a first processor 604.

The lens 601 is configured for performing optical framing. The lens 601 includes a movable anti-shake lens 6011. The movable anti-shake lens may change an imaging position of a captured picture on the image sensor 603.

The shake detector (gyroscope) 602 is configured for detecting current shake data of the camera.

The shake detector 602 is specifically configured for acquiring the current shake data of the camera based on preset periods. The shake detector 602 is a gyroscope. The gyroscope sends the current shake data of the camera to the first processor 604 after acquiring the current shake data of the camera based on preset periods.

The shake data includes position change data of the camera when the camera shakes. The position change data is the angle variation of the camera in the current period relative to the previous period.

The image sensor 603 is configured for capturing an image. It is generally a CCD or a CMOS (Complementary Metal Oxide Semiconductor). The image sensor 603 sends a video image signal captured to the image processing chip 606.

The first processor 604 is configured for acquiring current shake data of the camera, wherein the shake data includes position change data of the camera when the camera shakes, and the shake data is detected by the shake detector 602; determining the movement data of the anti-shake lens 6011, based on the preset relationship between the position change of the anti-shake lens for shake compensation and the shake data; and adjusting the position of the anti-shake lens 6011 based on the movement data, so as to cause the image sensor 603 to capture a shake-compensated image.

The first processor 604 is specifically configured for:
determining whether the camera shakes continuously in the preset number of periods or whether the camera is standstill continuously in the preset number of periods based on the angle variation, a preset shake threshold and a preset standstill threshold, and enabling or disabling the anti-shake function based on a determination result; and
when the anti-shake function is enabled, determining the movement data of the anti-shake lens 6011, based on the preset relationship between the position change of the anti-shake lens for shake compensation and the shake data.

It should be noted that the first processor 604 includes an OIS driving chip 6041, and the function of the first processor 604 is completed by the OIS driving chip 6041.

As shown in FIG. 6, the camera may further include: a second processor 605.

The second processor 605 is configured for receiving an operation instruction for enabling the anti-shake function or disabling the anti-shake function from a user;
sending an instruction for enabling or disabling the anti-shake function to the first processor 604 based on the operation instruction; and/or
receiving an anti-shake level set by the user, and sending the anti-shake level to the first processor 604 to be saved; wherein, the anti-shake level includes: the shake threshold and/or the standstill threshold.

The second processor 605 is further configured for sending a lens control instruction to the lens 601 and sending a video image processing instruction to the image processing chip 606.

It should be noted that the second processor 605 includes an MCU (Microcontroller Unit) 6051, and the function of the second processor 605 is completed by the MCU 6051.

As shown in FIG. 6, the camera in the present embodiment may further include: the image processing chip 606 configured for performing a conversion and match operation on a picture captured by the image sensor 603, so that the captured picture is close to the picture seen by the human eye. The conversion and match operation includes multiple operations that enhance sharpness and quality of the picture, such as noise elimination, red-eye elimination, contrast adjustment, and chromatic aberration adjustment. The video image signal is output after the conversion and match operation.

In the camera according to the embodiment of the present application, the current shake data for the position change of the camera is acquired by the gyroscope. The first processor 604 determines the movement data of the anti-shake lens 6011, based on the preset relationship between the position change of the anti-shake lens for shake compensation and the shake data; and adjusts the position of the anti-shake lens 6011 based on the movement data, so that the image sensor 603 captures a shake-compensated image. The present application achieves the anti-shake function by the position movement of the anti-shake lens 6011, which is different from the electronic anti-shake in prior art, which achieves the anti-shake function by processing the image. The camera according to the embodiment of the present application is not limited by the frame rate of the image, and can perform anti-shake processing for the higher or lower frequency shake, improving the anti-shake performance. Furthermore, in the embodiment of the present application, when the anti-shake function of the camera is enabled, the camera can determine through state that when the camera is standstill continuously in the preset number of periods, the anti-shake function is disabled. Therefore, according to the embodiment of the present application, the working time of the anti-shake component can be reduced and thus the service life of the anti-shake component is improved.

Figure 7:
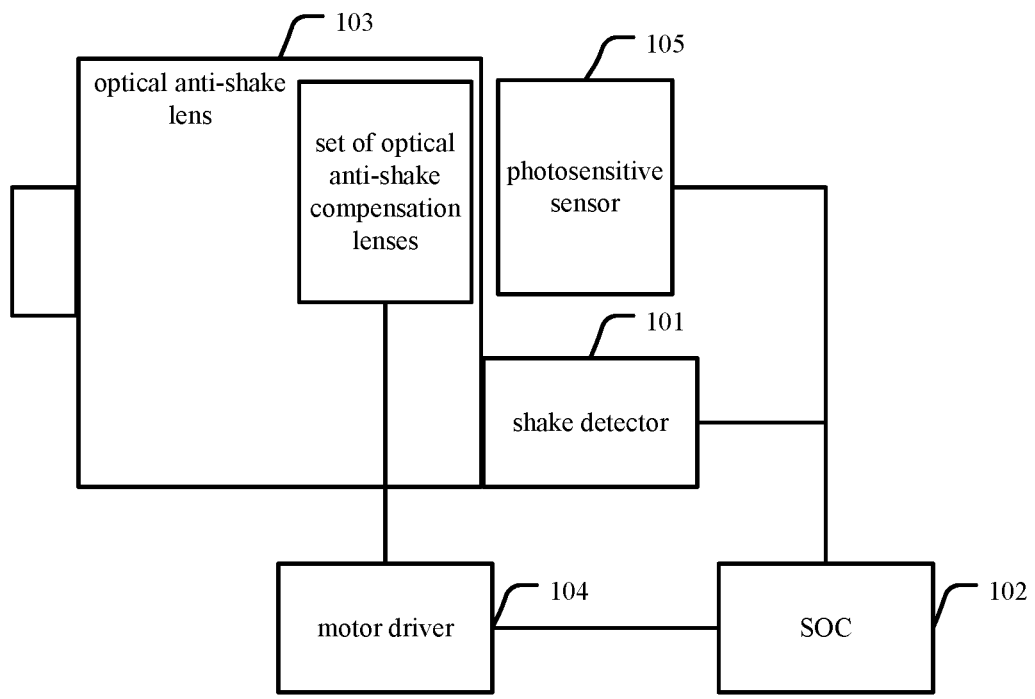
FIG. 7 shows a second structural diagram of a camera according to an embodiment of the present application.
Figure 8:
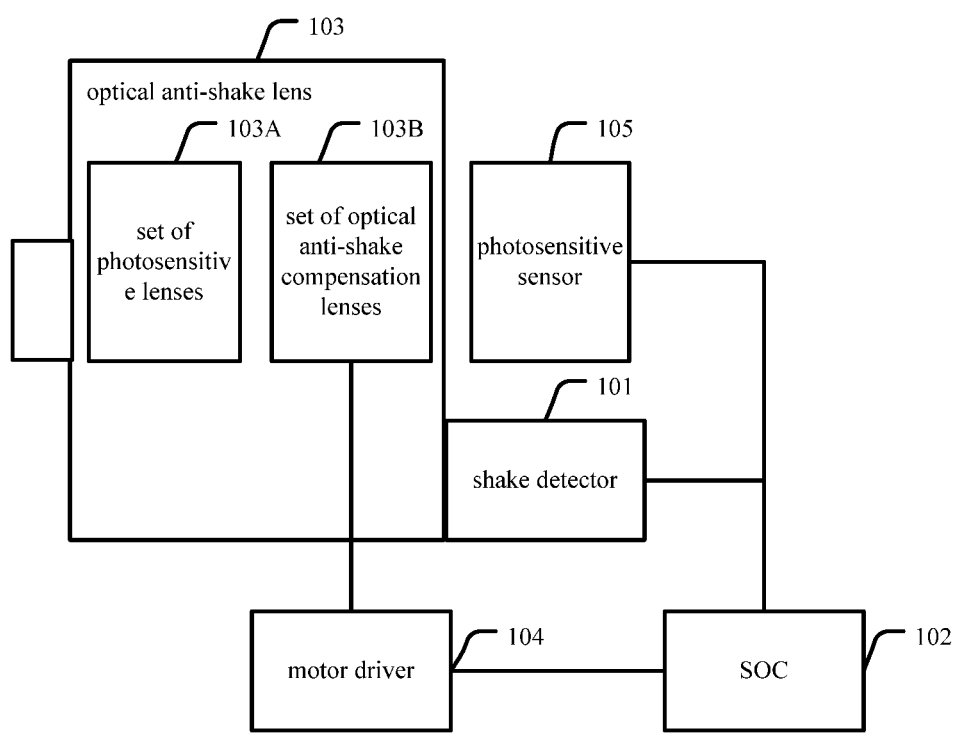
FIG. 8 shows a third structural diagram of a camera according to an embodiment of the present application.

FIG. 7 shows a second schematic structural diagram of a camera according to an embodiment of the present application. The camera may be a surveillance camera, including: a shake detector 101, an SOC (System on Chip) 102, a lens 103, a motor driver 104 and a photosensitive sensor 105.

The lens 103 may be an optical anti-shake lens. The optical anti-shake lens includes a movable optical lens(es), which is called as a set of movable optical anti-shake compensation lenses.

The shake detector 101 is electrically connected to the SOC 102. The SOC 102 is electrically connected to the shake detector 101, the motor driver 104 and the photosensitive sensor 105, respectively. The motor driver 104 is connected to the SOC 102 and the set of optical anti-shake compensation lenses in the optical anti-shake lens 103, respectively. The photosensitive sensor 105 is located in rear of the optical anti-shake lens 104.

It can be considered that a direction of the optical anti-shake lens 104 facing the shooting scene indicates the front of the optical anti-shake lens, and a direction opposite to the above direction indicates the rear of the optical anti-shake lens 104. In addition, the photosensitive sensor 105 may be located in rear of the optical anti-shake lens 104 and tightly connected to the lens 104. The photosensitive sensor 105 may also be located in rear of the optical anti-shake lens 104 and spaced apart from the lens 104 by a certain distance. The present application does not limit thereto.

The motor driver 104 may be connected to the optical anti-shake lens 103 through a connection element. This is an example of the present application. The connection manner between the driver 104 and the lens 103 is not limited herein.

Specifically, the shake detector 101 performs shake detection, obtains a shake signal and sends the shake signal to the SOC 102. The SOC 102 receives the shake signal sent by the shake detector 101, and sends a control signal to the motor driver 104 and the photosensitive sensor 105 based on the shake signal. The motor driver 104 receives the control signal sent by the SOC 102, and drives the set of optical compensation lenses in the optical anti-shake lens 103 to move based on the control signal. The photosensitive sensor 105 receives the control signal sent by the SOC 102, and captures light passing through the optical anti-shake lens 103 to form a shake-compensated image.

Based on an imaging principle behind the photosensitive sensor 105, the photosensitive sensor 105 captures light to form an image. When the captured light is focused on a center of a target surface of the photosensitive sensor 105, a clear image is formed. When the captured light is focused a position that is deviated from the center of the target surface of the photosensitive sensor 105, a blurred image is formed. In the present embodiment, the photosensitive sensor 105 captures light passing through the optical anti-shake lens 103 to form an image.

The shake signal may be a signal about information such as a shake angle, a shake frequency, and the like. For the control signal, there may be two cases.

In one case, after receiving the shake signal sent by the shake detector 101, the SOC 102 determines the displacement of the set of optical anti-shake compensation lenses in the optical anti-shake lens 103, to ensure that the light passing through the optical anti-shake lens 103 is focused on the center of the target surface of the photosensitive sensor 105, thereby forming a clear image. At this time, the control signal is a signal about the displacement.

In another case, the SOC 102 receives an image formed by the photosensitive sensor 105, and process the image to obtain a surveillance video. At this time, the control signal may be understood as a signal for notifying the photosensitive sensor 105 of performing image acquisition.

The displacement may be a horizontal displacement or a vertical displacement.

The above cases are examples of the control signal. The present application does not limit the specific form of the control signal.

In an implementation of the present application, the shake detector 101 may be a gyroscope.

Since a field of view of an optical anti-shake lens is generally limited, in order to obtain a larger field of view, the surveillance camera may include a plurality of optical anti-shake lenses to expand the field of view of the entire camera. In view of this, in an implementation of the present application, the surveillance camera includes at least two optical anti-shake lenses 103. Moreover, since the optical anti-shake lenses 103 correspond to different fields of view, respectively, the light passing through the optical anti-shake lenses 103 may form different images. To ensure that an image is captured in the field of view of each of the anti-shake lenses 103, the number of the photosensitive sensors 105 is equal to the number of optical anti-shake lenses 103.

In addition, an optical anti-shake lens and a corresponding drive program are already available, but the optical anti-shake lens has not been applied in the surveillance camera. In the present embodiment, the application of the optical anti-shake lens into the surveillance camera greatly helps to improve the quality of images captured by the surveillance camera when it shakes.

In an implementation of the present application, FIG. 2 provides another structural diagram of a surveillance camera. Compared with the foregoing embodiment, in present embodiment, the optical anti-shake lens 103 further includes a set of photosensitive lenses. Thus, the optical anti-shake lens 103 includes a set of photosensitive lenses 103A and a set of optical anti-shake compensation lenses 103B.

The set of photosensitive lenses 103A is located in front of the set of optical anti-shake compensation lenses 103B. The photosensitive sensor 105 is located in rear of the set of optical anti-shake compensation lenses 103B.

It can be considered that a direction of the set of optical anti-shake compensation lenses 103B facing the shooting scene indicates the front of the set of optical anti-shake lenses 103B, and a direction opposite to the above direction indicates the rear of the set of optical anti-shake compensation lenses 103B.

Specifically, the set of photosensitive lenses 103A may include a set of magnifying lenses and a set of focusing lenses. The set of focusing lenses is located in rear of the set of magnifying lenses and in front of the set of optical anti-shake compensation lenses 103B.

It can be considered that a direction of the set of magnifying lenses facing the shooting scene indicates the front of the set of magnifying lenses, and a direction opposite to the above direction indicates the rear of the set of magnifying lenses.

The set of magnifying lenses include at least one lens. In order to obtain a better light processing effect, the set of magnifying lenses include at least two lenses in an implementation of the present application.

The set of focusing lenses include at least one lens. In order to obtain a better light processing effect, the set of focusing lenses include at least two lenses in another implementation of the present application.

In an implementation of the present application, the motor driver 104 may include a motor driving chip and an optical compensation motor.

The motor driving chip is electrically connected to the SOC and the optical compensation motor respectively. The optical compensation motor is connected to the set of optical anti-shake compensation lenses to drive the set of optical anti-shake compensation lenses to move.

It can be seen that the surveillance camera according to the embodiments includes: a shake detector, an SOC, an optical anti-shake lens including a set of movable optical anti-shake compensation lenses, a motor driver and a photosensitive sensor. The shake detector sends a shake signal to the SOC connected thereto. The SOC may send a control signal to the motor driver and the photosensitive sensor connected thereto based on the shake signal. The motor driver, after receiving the control signal, drives the set of optical anti-shake compensation lenses in the optical anti-shake lens connected thereto to move, thereby adjusting the focus of the light passing through the optical anti-shake lens on the photosensitive sensor to obtain a shake-compensated image. Therefore, the surveillance camera according to the various embodiments of the present application can capture a clear surveillance video when the surveillance camera shakes.

The embodiment of the present application provides a storage medium for storing executable program code. The executable code, when being executed, performs the anti-shake method for a camera according to the embodiment of the present application, and in particular the anti-shake method for any one camera according to the embodiment of the present application. The camera includes a lens including a movable anti-shake lens, a shake detector and an image sensor.

In the present embodiment, the storage medium stores an application program which, when being executed, preforms the anti-shake method for a camera according to the embodiment of the present application. Therefore, it is possible to achieve the anti-shake function by the position movement of the anti-shake lens, which is different from the electronic anti-shake in prior art, which achieves the anti-shake function by processing the image. The anti-shake method according to the embodiment of the present application is not limited by the frame rate of the image, and can perform anti-shake processing for the higher or lower frequency shake, improving the anti-shake performance.

An embodiment of the present application provides an application program, wherein the application program, when being executed, performs the anti-shake method for a camera according to the embodiment of the present application, and in particular the anti-shake method for any one camera according to the embodiment of the present application. The camera includes: a lens including a movable anti-shake lens, a shake detector and an image sensor.

It should be noted that the relationship terms used herein, such as "first", "second" and the like are only used to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles, or devices, including a series of elements, include not only those elements that have been listed, but also other elements that is not specifically listed or the elements intrinsic to these processes, methods, articles, or devices. Without further limitations, elements defined by the wording "comprise(s) a/an . . . " and "include(s) a/an . . . " do not exclude additional identical elements in the processes, methods, articles, or devices that includes the listed elements.

All of the embodiments in the description are described in a correlated manner, and identical or similar parts in various embodiments can refer to one another. In addition, the description for each embodiment focuses on the differences from other embodiments. In particular, the embodiments of the apparatus, the application program and the storage medium are described briefly, since they are substantially similar to the embodiment of the method, and the related contents can refer to the description of the embodiment of the method.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. An anti-shake method for a camera, wherein the camera comprises a lens, a shake detector and an image sensor, the lens comprising a movable anti-shake lens; the method comprises:

acquiring current shake data of the camera by the shake detector, wherein the shake data comprises position change data of the camera when the camera shakes;

determining position change data of the anti-shake lens based on the current shake data of the camera and a preset relationship between position change of the anti-shake lens for shake compensation and shake data; and adjusting a position of the anti-shake lens based on the position change data of the anti-shake lens, so as to cause the image sensor to capture a shake-compensated image, wherein acquiring current shake data of the camera by the shake detector comprises: for each of preset periods, acquiring shake data of the camera in this preset period by the shake detector, wherein the shake data comprises an angle variation of the camera in a current period relative to a previous period;

before determining position change data of the anti-shake lens based on the current shake data of the camera and a preset relationship between position change of the anti-shake lens for shake compensation and shake data, the method further comprises:

determining whether the camera shakes continuously in a preset number of periods based on shake data of the camera in the preset number of periods, a preset shake threshold and a preset standstill threshold, and if the camera shakes continuously in the preset number of periods, enabling an anti-shake function; and the step of determining position change data of the anti-shake lens based on the current shake data of the camera and a preset relationship between position change of the anti-shake lens for shake compensation and shake data, comprises:

if the anti-shake function is enabled, determining the position change data of the anti-shake lens based on the current shake data of the camera and the preset relationship between position change of the anti-shake lens for shake compensation and shake data.

2. The method of claim 1, wherein the step of determining whether the camera shakes continuously in a preset number of periods based on shake data of the camera in the preset number of periods, a preset shake threshold and a preset standstill threshold, and if the camera shakes continuously in the preset number of periods, enabling an anti-shake function, comprises:

determining a first camera state of the camera in a previous period of the current period, wherein the camera state comprises a standstill state or a shake state; and when the first camera state is the standstill state, determining whether the camera shakes in the current period, based on the preset shake threshold and the angle variation contained in the shake data of the camera in the current period; and determining whether the camera shakes continuously in the preset number of periods; if the camera shakes continuously in the preset number of periods, determining that a second camera state of the camera in the current period is the shake state, and enabling the anti-shake function; if the camera does not shake continuously in the preset number of periods, determining that the second camera state of the camera in the current period is the standstill state; and when the first camera state is the shake state, determining and recording whether the camera is standstill in the current period based on the preset standstill threshold and the angle variation contained in the shake data of the camera in the current period; and determining whether the camera is standstill continuously in the preset number of periods; if the camera is standstill continuously in the preset number of periods, determining that the second camera state of the camera in the current period is the standstill state, and disabling the anti-shake function; if the camera is not standstill continuously in the preset number of periods, determining that the second camera state of the camera in the current period is the shake state.

3. The method of claim 2, wherein the step of determining whether the camera shakes in the current period, based on the preset shake threshold and the angle variation contained in the shake data of the camera in the current period, comprises:

determining whether the angle variation contained in the shake data of the camera in the current period is greater than the preset shake threshold; if the angle variation is greater than the preset shake threshold, determining that the camera shakes in the current period, and recording the number of times that the camera shakes; if the angle variation is not greater than the preset shake threshold, determining that the camera does not shake, and resetting the number of times that the camera shakes;

the step of determining and recording whether the camera is standstill in the current period based on the preset standstill threshold and the angle variation contained in the shake data of the camera in the current period, comprises:

determining whether the angle variation contained in the shake data of the camera in the current period is less than the preset standstill threshold; if the angle variation is less than the preset standstill threshold, determining that the camera is standstill in the current period, and recording the number of times that the camera is standstill; if the angle variation is not less than the preset standstill threshold, determining that the camera is not standstill in the current period, and resetting the number of times that the camera is standstill.

4. The method of claim 1, wherein the preset relationship between shake data and position change of the anti-shake lens for shake compensation, comprises: a correspondence between the angle variation of the camera and a compensation vector of the anti-shake lens under a preset focal length;

the step of determining position change data of the anti-shake lens based on the current shake data of the camera and a preset relationship between position change of the anti-shake lens for shake compensation and shake data, comprises:

determining a direction of position change and a distance of position change of the anti-shake lens, based on the correspondence between the angle variation of the camera and the compensation vector of the anti-shake lens under the preset focal length;

the step of adjusting a position of the anti-shake lens based on the position change data of the anti-shake lens, so as to cause the image sensor to capture a shake-compensated image, comprises:

adjusting the position of the anti-shake lens based on the determined direction of position change and the determined distance of position change of the anti-shake lens, so as to cause the image sensor to capture the shake-compensated image.

5. The method of claim 1, wherein the shake detector is a gyroscope;

the step of acquiring current shake data of the camera by the shake detector, comprises:

receiving current angular velocity data sent by the gyroscope; and calculating the angle variation of the camera in the current period relative to the previous period, based on the length of the preset period, the current angular velocity data, and angular velocity data received in the previous period.

6. The method of claim 1, wherein the method further comprises: receiving one or more of an operation instruction for enabling the anti-shake function, an operation instruction for disabling the anti-shake function, and an instruction for setting an anti-shake level, which are sent by a user;

if the operation instruction for enabling the anti-shake function is received from the user, enabling the anti-shake function;

if the operation instruction for disabling the anti-shake function is received form the user, disabling the anti-shake function; and if the instruction for setting an anti-shake level is received from the user, reading and saving an anti-shake level carried in the instruction for setting an anti-shake level, wherein the anti-shake level comprises: the shake threshold and/or the standstill threshold.

7. A camera, comprising: a lens, a shake detector, an image sensor and a first processor, wherein the lens comprises a movable anti-shake lens;

the lens is configured for optical framing;

the shake detector is configured for detecting current shake data of the camera;

the image sensor is configured for capturing an image;

the first processor is configured for acquiring current shake data of the camera by the shake detector, wherein the shake data comprises position change data of the camera when the camera shakes; determining position change data of the anti-shake lens based on the current shake data of the camera and a preset relationship between position change of the anti-shake lens for shake compensation and shake data; and adjusting a position of the anti-shake lens based on the position change data of the anti-shake lens, so as to cause the image sensor to capture a shake-compensated image, wherein the shake detector is configured for: for each of preset periods, acquiring the shake data of the camera in this preset period;

the position change data of the camera is an angle variation of the camera in a current period relative to a previous period;

the first processor is configured for:

determining whether the camera shakes continuously in a preset number of periods based on shake data of the camera in the preset number of periods, a preset shake threshold and a preset standstill threshold, and if the camera shakes continuously in the preset number of periods, enabling an anti-shake function;

if the anti-shake function is enabled, determining the position change data of the anti-shake lens based on the current shake data of the camera and the preset relationship between position change of the anti-shake lens for shake compensation and shake data.

8. The camera of claim 7, further comprising a second processor configured for receiving one or more of an operation instruction for enabling the anti-shake function, an operation instruction for disabling the anti-shake function, and an instruction for setting an anti-shake level, which are sent by a user;

if the operation instruction for enabling the anti-shake function is received from the user, enabling the anti-shake function;

if the operation instruction for disabling the anti-shake function is received form the user, disabling the anti-shake function; and if the instruction for setting an anti-shake level is received from the user, reading and saving an anti-shake level carried in the instruction for setting an anti-shake level, wherein the anti-shake level comprises: the shake threshold and/or the standstill threshold.

9. A surveillance camera, comprising: a shake detector, a system on chip, a lens, a motor driver, and a photosensitive sensor, wherein the lens comprises a movable optical lens;

the shake detector is electrically connected to the system on chip, and sends a shake signal to the system on chip;

the system on chip is electrically connected to the shake detector, the motor driver and the photosensitive sensor, respectively, and receives the shake signal sent by the shake detector, and sends a control signal to the motor driver and the photosensitive sensor based on the shake signal;

the motor driver is connected to the system on chip and the optical lens, and receives the control signal sent by the system on chip to drive the optical lens to move; and the photosensitive sensor is located in rear of the lens, and receives the control signal sent by the system on chip and captures light passing through the lens to form a shake-compensated image, wherein the system on chip is configured for:

for each of preset periods, receiving current shake data of the camera in this preset period acquired by the shake detector, wherein the shake data comprises position change data of the camera when the camera shakes, which is an angle variation of the camera in a current period relative to a previous period;

determining whether the camera shakes continuously in a preset number of periods based on shake data of the camera in the preset number of periods, a preset shake threshold and a preset standstill threshold, and if the camera shakes continuously in the preset number of periods, enabling an anti-shake function;

if the anti-shake function is enabled, determining position change data of the movable optical based on the current shake data of the camera and a preset relationship between position change of the movable optical lens for shake compensation and shake data; and adjusting a position of the movable optical lens based on the position change data of the movable optical lens, so as to cause the photosensitive sensor to capture a shake-compensated image.

10. The surveillance camera of claim 9, wherein, the lens further comprises: a photosensitive lens, wherein, a set of photosensitive lenses is located in front of the optical lens; and the photosensitive sensor is located in rear of the optical lens.

11. The surveillance camera of claim 10, wherein the photosensitive lens comprises: a magnifying lens and a focusing lens; wherein, the focusing lens is located in rear of the magnifying lens and in front of the optical anti-shake compensation lens.

12. The surveillance camera of claim 11, wherein the magnifying lens comprises at least two magnifying lenses.

13. The surveillance camera of claim 11, wherein the focusing lens comprises at least two focusing lenses.

14. The surveillance camera of claim 10, wherein, the motor driver comprises: a motor driving chip and an optical compensation motor; wherein, the motor driving chip is electrically connected to the system on chip and the optical compensation motor, respectively; and the optical compensation motor is connected to the optical lens to drive the optical lens to move.

15. The surveillance camera of claim 9, wherein, the shake detector is a gyroscope.

16. The surveillance camera of claim 9, wherein, the surveillance camera comprises at least two optical lenses; and the number of the photosensitive sensors is equal to the number of the optical lenses.

* * * * *